3 Sheets--Sheet 1.

WILLIAM R. WRIGHT.
Improvement in Cotton-Seed Planter.

No. 127,400.             Patented May 28, 1872.

3 Sheets--Sheet 2.

WILLIAM R. WRIGHT.
Improvement in Cotton-Seed Planter.

No. 127,400. Patented May 28, 1872.

Witnesses.
H. Poole
John R. Young

Inventor.
Wm. R. Wright, by
Prindle & Co., his
attys.

3 Sheets--Sheet 3.

WILLIAM R. WRIGHT.
Improvement in Cotton-Seed Planter.

No. 127,400. Patented May 28, 1872.

Witnesses.
C. H. Poole.
John R. Young.

Inventor.
Wm. R. Wright, by
Prindle and Co. his
Attys.

AM. PHOTO-LITHOGRAPHIC CO. N.Y. (OSBORNE'S PROCESS.)

127,400

UNITED STATES PATENT OFFICE.

WILLIAM R. WRIGHT, OF ALLENDALE, SOUTH CAROLINA, ASSIGNOR OF TWO-THIRDS OF HIS RIGHT TO CHAS. E. MALONE AND EDWD. G. WILLINGHAM, OF SAME PLACE.

IMPROVEMENT IN COTTON-SEED PLANTERS.

Specification forming part of Letters Patent No. 127,400, dated May 28, 1872.

*To all whom it may concern:*

Be it known that I, WM. R. WRIGHT, of Allendale, in the county of Barnwell and in the State of South Carolina, have invented certain new and useful Improvements in Cotton-Seed Planters; and do hereby declare that the following is a full, clear, and exact description thereof, reference being had to the accompanying drawing making a part of this specification, in which—

Figure 1:
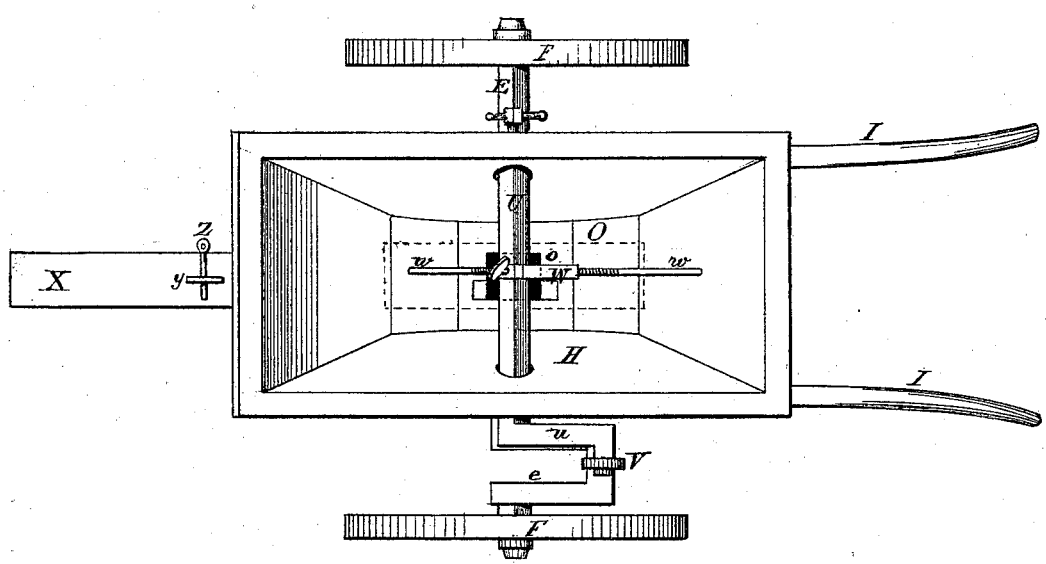
Figure 2:
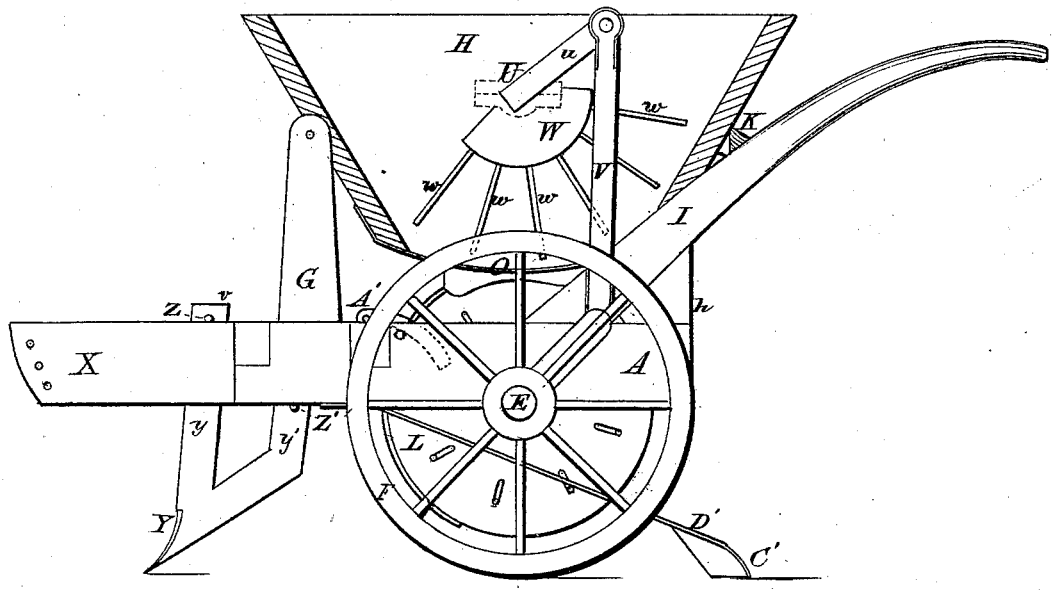
Figure 3:
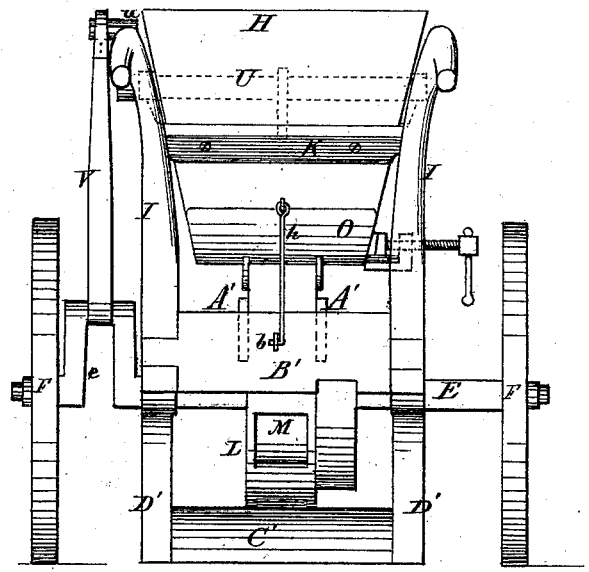
Figure 4:
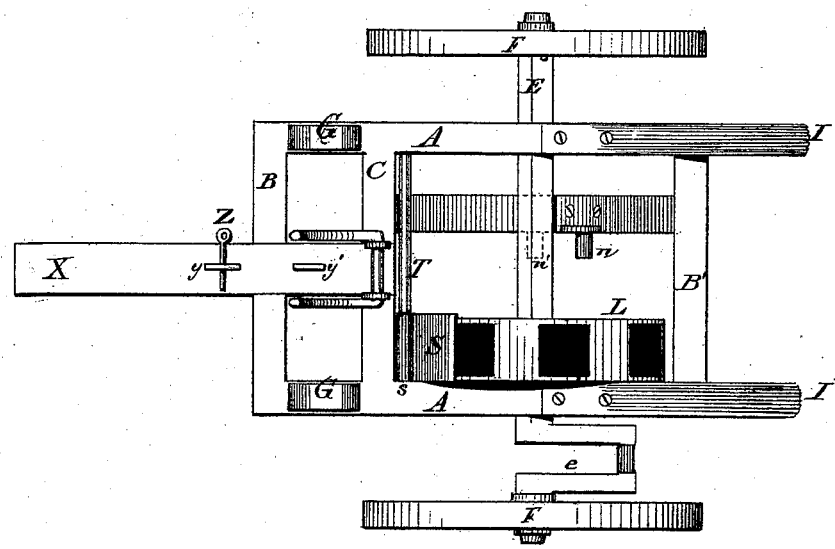
Figure 5:
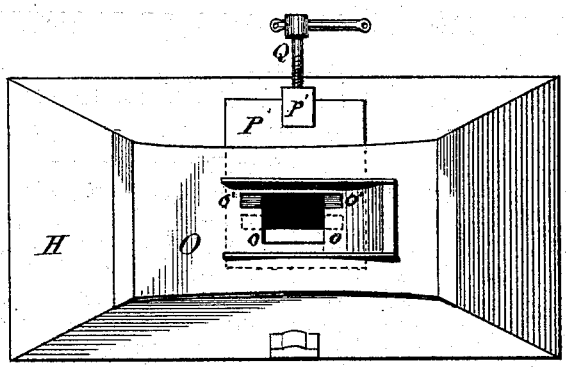
Figure 6:
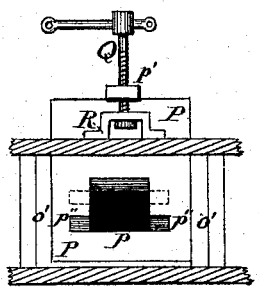
Figure 7:
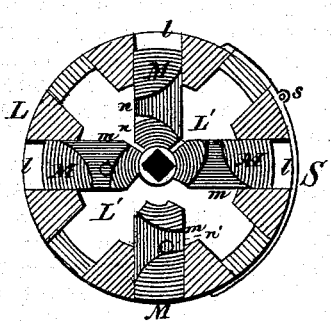
Figure 8:
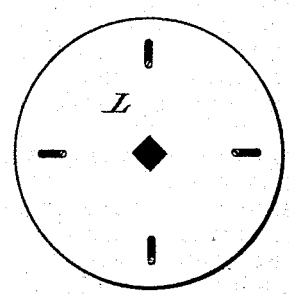

Figure 1 is a plan view of the upper side of my device. Fig. 2 is a side elevation of the same with a portion of the seed-hopper removed, so as to afford a view of its interior. Fig. 3 is a rear elevation of said device. Fig. 4 is a plan of the upper side of the same with the hopper removed and as arranged for sowing fertilizers. Fig. 5 is a plan view of the lower side of the hopper and its adjustable discharge-slide or gate. Fig. 6 is a like view of the upper side of said gate with said hopper removed; and Figs. 7 and 8 are elevations of opposite sides of the seed-wheel.

Letters of like name and kind refer to like parts in each of the figures.

My invention has for its object the planting of cotton or other seed which are rendered sticky exteriorly by the presence of a resinous substance, and which, therefore, would not pass through the planting apparatus by the mere force of gravity; and it consists, principally, in the construction and operation of the seed-wheel or dropper, substantially as and for the purpose hereinafter specified. It consists, further, in the peculiar construction of the slide or gate, for regulating the passage of seed from the hopper to the seed-wheel, substantially as and for the purpose hereinafter shown. It consists, further, in the means employed for securing the longitudinal adjustment upon the axle of the seed-wheel, substantially as and for the purpose hereinafter shown and described.

In the annexed drawing, A and A represent two side rails, secured together by means of two cross-bars, B and B', placed at their ends, and a third cross-bar, C, extending between said side rails in rear of their forward ends, at a point about one-fourth the distance from the same, to the rear ends of said rails, the whole thus combined forming the supporting-frame of the device. Journaled within suitable bearings D upon the lower sides of the rails A, and midway between the cross-bars B' and C, is an axle, E, upon the projecting ends of which are in turn journaled two ground-wheels, F, said wheels being provided with the usual clutches, so as to cause them to engage with and revolve said axle only when turned in a forward direction. Extending vertically upward from the forward ends of the side rails A are two standards, G, between which, at their upper ends, is pivoted the forward side of a hopper, H, (having the form shown in Figs. 1 and 2,) the rear side of which hopper passes between two handles, I, that extend upward and rearward from the rear ends of said rails. A cross-bar, K, extending horizontally across the rear side of the hopper, with its ends bearing against the forward sides of the handles, prevents the rear end of said hopper from dropping below a horizontal line, while permitting it to be freely turned upward and forward. A hook, $h$, pivoted to or upon the rear side of the hopper, and engaging with an eye, $b$, attached to the rear cross-bar, locks said hopper firmly in position upon or with relation to the frame. Fitted to or upon the axle E, between the side rails of the frame, is a seed-wheel or dropper, L, that consists of a circular metal disk, having a thickness equal to about one-fourth its diameter, upon or within one side of which is provided a recess, L', that has a diameter equal to about one-half the diameter of said wheel, and extends horizontally nearly through to the opposite side of the same. Passing radially outward from the recess L' are a series of openings, $l$, which have parallel sides and a rectangular or square form in cross-section, and are arranged within the dropper at points equidistant from each other. Within each opening thus formed is fitted a metal block or plunger, M, which corresponds in size with said opening, and has a length equal to about three-fourths the distance from the central hub $k$ to the outer side of the dropper. Within the outer face of each plunger is formed a V-shaped notch, $m$, the inclined sides of which engage with two studs or pins, $n$ and $n'$, that extend horizontally inward from a bar, N, secured upon and extending in a semicircle between the cross-bars B' and C and beneath the axle. The stud $n$ is placed in rear of the center of motion of the dropper, and at such a distance from said center as to cause it to bear against the inner side of the notch m, (when said dropper is turned forward,) and press the plunger inward until its inner end bears against the hub k, while the second stud n' is placed beneath and in a line with the axle, and at such a distance, radially, as to cause it to engage with the outer side of said notch and press said plunger outward to its furthest limit.

As thus arranged, it will be seen that as the dropper is rotated forward its plungers, as they pass upward, are drawn inward, so as to leave between their outer ends and the periphery of said dropper an uninclosed portion of the openings l, into which seed may be dropped, while, as said plunger passes downward, they are forced outward until their ends are flush with the periphery of said dropper, and the contents of the openings are expelled.

The lower side of the hopper is, preferably, inclosed by means of a metal plate, O, within which, immediately over the dropper, is formed an opening, o, which corresponds in size and shape to the corresponding features of the seed-openings l, and permits the passage thereto of seed from said hopper. In order that the size of the opening o may be varied so as to increase or diminish the quantity of seed sown, a second metal plate or slide, P, is placed upon the upper side of the metal bottom of the hopper, and is confined in place vertically and in a line with the draft by means of suitable guide-strips o', which inclose the edges of said slide and permit it to move longitudinally or in a line with the axle. An opening, p, corresponding in size and shape, is formed in and through the slide P, and when caused to coincide with the opening o permits the free passage of seed from the hopper; but as said slide is moved outward, the quantity of seed passing downward to the dropper is constantly diminished until the opposite edges of said openings o and p meet, when the flow of seed is suspended. In order that the necessary adjustment of the slide may be readily made, a lug, p', is secured upon and extends upward from its outer end, and is provided with a threaded opening, through which passes a screw, Q. The inner end of the screw being swiveled within a suitable lug, R, attached to or upon the side of the hopper, it will be seen that by turning said screw to the right or left the slide will be drawn outward so as to diminish the size of the seed-openings, or pressed inward so as to enlarge the same. A covering-plate, S, corresponding in size and shape to the periphery of the dropper, extends from the lower side of the hopper, immediately in front of its seed-openings, forward and downward to or near the point where the seed is expelled from said dropper, and prevents said seed from passing outward until it has reached the desired point. The plate S is secured in place by means of an ear, s, upon its upper outer side, through which passes a rod, T, that, extending horizontally across the frame, has its ends confined within the side rails A.

As the seed within the hopper is liable to become lodged so as to prevent its passage to the dropper, it has been found necessary to thoroughly agitate the mass at each revolution of the ground-wheels, said result being accomplished by the following-described means: A shaft, U, provided upon one end with a crank, u, passes horizontally through the sides of the hopper and rests in suitable bearings attached to the same. A connection, V, pivoted at one end to or upon the crank u, and at its opposite end upon a crank, e, formed upon the axle E, gives to the shaft U a semi-rotary movement in opposite directions at each revolution of said axle. Upon the shaft U is placed a metal head, W, having the form shown in Fig. 2, from which extend radially outward a series of arms, w, the ends of which, as said shaft rotates, pass near to the bottom of the hopper and thoroughly stir up the contents of the same. From the cross-bar C extends horizontally forward the usual pole X, for connecting horses to or with the machine. A shovel, Y, is placed directly beneath and connected with said pole by means of two standards, y and y', the first of which extends vertically upward from said shovel into and through a correspondingly-shaped slot made in said pole in front of the cross-bar B, while the second standard, y', extends rearward and upward until in rear of said cross-bar B, and then passes vertically upward through said pole. A pin, Z, passing through the standard y, immediately above the pole, prevents the shovel from dropping downward, while a similar pin, Z', passing through the rear standard, immediately below said pole, holds said shovel in place, and prevents it from being forced rearward and upward. By providing a number of additional pin-holes in each standard the vertical position of the shovel can be quickly and easily changed.

In order that the machine may be employed for sowing fertilizers, the dropper is made to slide longitudinally upon the axle from its central position beneath the hopper to a point immediately within the side rail A, by which means the discharge-opening of said hopper is unobstructed, and the fertilizer permitted to fall therefrom directly to the ground. A right-angled clutch, A', pivoted to or upon the cross-bar C, may be caused to loosely embrace the sides of said dropper, so as to hold it in a central position; or said clutch may be raised, the dropper moved to one side, and the clutch again dropped to place, with one of its arms bearing against and holding said dropper in such position.

When used for fertilizers it is necessary that the discharge-opening of the hopper should be lengthened in a line with the draft and shortened in an opposite direction. To accomplish this result the opening p within the slide P is provided with narrow notches p'', upon opposite sides in a line with the draft, and upon the outer side in a line with the axle. Similar notches o'' are provided in corresponding positions within the plate O, upon the opposite side (in a line with the axle) from said notches $p''$.

As thus arranged, it will be seen that when the slide is drawn outward so as to cause the notches $o''$ and $p''$ to coincide, the result is the production of an opening having a length equal to the distance between the outer sides of said notches, and a breadth, at its widest, corresponding to their width. When the slide is moved inward sufficiently its solid portions cover the notches in the plate O, while in turn its notches are covered by the solid portions of said plate.

A drag or covering bar, C', attached to the rear ends of two springs, D', the front ends of which are secured upon the lower side and forward ends of the side rails A, completes the device, the operation of which has been sufficiently explained.

Having thus fully set forth the nature and merits of my invention, what I claim as new is—

1. The seed-wheel or dropper L, constructed with the recess L' and radial openings $l$, and containing the plungers M, provided with the notches $m$, in combination with the studs or pins $n$ and $n'$, substantially as and for the purpose specified.

2. The slide or gate P, provided with the opening $p$ and notches $p''$, in combination with the plate O, provided with the opening $o$ and notches $o''$, substantially as and for the purpose shown.

3. In combination with the seed-wheel or dropper L, fitted to and sliding upon the axle E, the clutch A', pivoted upon the frame and engaging with said dropper, substantially as and for the purpose shown and described.

In testimony that I claim the foregoing I have hereunto set my hand this 21st day of March, 1872.

W. R. WRIGHT.

Witnesses:
JOHN R. YOUNG,
EDM. F. BROWN.